(12) United States Patent
Johnson

(10) Patent No.: US 6,660,355 B2
(45) Date of Patent: Dec. 9, 2003

(54) WEAR RESISTANT ARTICLES

(75) Inventor: David Callum Johnson, Kenilworth (GB)

(73) Assignee: Dunlop Aerospace Limited, Coventry (GB)

(*) Notice: Subject to any disclaimer, the term of this patent is extended or adjusted under 35 U.S.C. 154(b) by 125 days.

(21) Appl. No.: 09/745,775

(22) Filed: Dec. 22, 2000

(65) Prior Publication Data

US 2001/0001189 A1 May 17, 2001

(51) Int. Cl.$^7$ .............................................. B32B 3/02
(52) U.S. Cl. ................... 428/64.1; 428/66.2; 428/114; 428/293.7; 442/388; 523/149; 523/152; 523/155; 264/29.2
(58) Field of Search ................ 428/64.1, 66.2, 428/114, 293.7; 442/388; 523/149, 155, 152; 264/29.2

(56) References Cited

U.S. PATENT DOCUMENTS 3,632,460 A    1/1972   Palfreyman

FOREIGN PATENT DOCUMENTS

| EP | 424988 | 5/1991 | |
|----|--------|--------|--|
| EP | 496695 | 7/1992 | |
| EP | 721835 | 7/1996 | |
| GB | 2012671 | 8/1979 | |
| GB | 1587515 | 4/1981 | |
| GB | 2298687 | 9/1996 | |
| JP | 6210748 | 8/1994 | |
| JP | 2547110 B2 * | 10/1996 | ........... C04B/35/52 |

OTHER PUBLICATIONS

*Carbon*, "Structural Studies of Wear Debris From Carbon–Carbon Composite Aircraft Brakes", by Hutton et al., (1999) vol. 37, pp. 907–916.
*Carbon*, Microstructure of Worn Pitch/Resin/CVI C–C Composites, by Murdie, et al. (1991) vol. 29, pp. 335–342.
"C/C Composite Materials for Aircraft Brakes", by Awasthi, et al. (1988), vol. 3, No. 5 pp. 449–451.

* cited by examiner

*Primary Examiner*—Elizabeth M. Cole
(74) *Attorney, Agent, or Firm*—Caesar, Rivise, Bernstein, Cohen, & Pokotilow, Ltd.

(57) ABSTRACT

An annular body, and method of making same, comprising at least one wear surface portion, the portion comprising a plurality of layers held in a matrix, each layer consisting essentially of fibres which extend generally in one direction and parallel to each other and from the centre of the body to the periphery, whereby the wear of that surface portion is improved. The body can be formed into an aircraft brake disc.

16 Claims, 1 Drawing Sheet

WEAR RESISTANT ARTICLES

The invention relates to wear resistant articles, and in particular brake discs, e.g. for use on aircraft. Additionally, the invention relates to an improved method for the manufacture of such articles and in particular to improving the wear resistance of carbon-carbon composite disc shaped bodies.

An aircraft brake assembly is a pack of annular stator discs interleaved with annular rotary rotor discs together with thruster means to bring the stator and rotor discs into frictional engagement. There is a need for discs having faces of improved wear resistance.

Mechanisms for the wear of carbon have been proposed by Aswasthi and Wood (Advanced Ceramic Materials, volume 3, no. 5, 1988, pp449–451), Murdie et al (Carbon, 29, (1991) 335–342), and Hutton et al (Carbon, 37, (1999) 907–916). High wear rates at carbon-carbon friction surfaces are generally associated with the generation and loss of abrasive wear particles from the surfaces at low brake energy conditions. Low wear in carbon-carbon is generally associated with the retention of wear particles on the surface and which are modified through a shearing action to form a film at the friction surface under high energy brake conditions.

Ronyak and Leffel, in their European Patent Publication No. 0721835 A2, disclose a shaped filamentary structure and method of making same, in which segments of a disc, which is to form a brake disc, comprise multi-directional filaments extending in at least two directions. The filaments are arranged such that they extend generally parallel to the bearing or wear surface of the disc. The segments are assembled such that they define an overlapping contiguous structure of helical form, the whole being needlepunched to cross-link the layers and provide a preform suitable for a densification process.

Lawton and Smith, in their European Patent Publication No. 0424988 A1, disclose a method of producing a shaped filamentary article which may be used in an aircraft braking system. In order to produce such a structure, segments of an annulus are laid on to a substrate to form a layer, each segment comprising either radial or tangential fibres, and subsequently the segments are needlepunched to the substrate whilst effecting relative rotation of the substrate and layers relative to the needlepunch head. In such a fashion a disc is built up which, once the desired number of layers have been built up, may be peeled from the substrate to allow for further treatment such as densification.

It is one object of this invention to provide a body, such as a brake disc, having the fibres oriented in such a way that the disc has improved wear resistance to give increased brake life or reduced weight for the same life and other advantages.

According to the invention in one aspect there is provided an annular body comprising at least one wear surface portion, the portion comprising a plurality of layers held in a matrix, each layer consisting essentially of fibres which extend generally in one direction and parallel to each other and from the centre of the body to the periphery, whereby the wear of that surface portion is improved.

Typically in a disc having a pair of opposed faces, both of which may have the same arrangement and, in an embodiment of the invention, an intermediate portion of the disc may comprise a substantially identical or a distinct arrangement to that of the wear surface portion(s).

Each layer may comprise a plurality of segmental portions, each having an inner periphery and an outer periphery, the parallel fibres preferably extending therebetween.

Typically the segmental portions will have an annular size that does not give a whole number of segments in one layer to avoid alignment of segment joints across adjacent layers, resulting in a spiral lay up through the thickness of the disc. The segment angle may range widely from say 20° to 70°, more preferably about 40° to about 50°, most preferably 48°.

Preferably the generally parallel long fibres are connected by relatively short connecting lengths of fibre, which may be called the non-portion-spanning fibres. Methods of introducing the short connecting fibres include needle punching the long fibres using barbed needles, or more preferably, needle punching a staple felt of short crimped fibres to the long fibres, the short fibres in the staple felt being aligned generally perpendicular to the long fibres.

The fibres may be made from a stabilised or oxidised form of rayon, polyacrylonitrile; wool; pitch, or the like; or any combination that will, on heat treatment, produce carbon fibres. The long fibres in the preform may range in length according to the size of the body to be formed. The length of the connecting short fibres will be in the usual range. There are several well known methods for the manufacture of composite friction materials, especially those containing carbon fibres in a carbon matrix. Commercially available composites comprise random chopped fibre, 2D, 3D or needled fibre architectures in a matrix derived from pitch or resin precursors, or by chemical vapour infiltration or deposition or any combination of the above.

In another aspect therefore the invention provides a method of forming an annular body comprising a plurality of layers held in a carbon matrix, the method comprising:

forming a sheet consisting essentially of longitudinally extending generally parallel long fibres;

carbonising the fibres in the sheet to form a carbonised sheet;

cutting from the carbonised sheet segmental portions having an outer curved edge and an inner curved edge, and in which the fibres lie generally parallel to each other and extend from the inner edge to the outer edge;

arranging the segmental portions in a circular array to form an annular layer;

building up a plurality of the layers to form a preform; and densifying the preform by introducing carbon containing vapour to form the carbon matrix.

The annular body may comprise an aircraft brake disc or a brake or clutch disc.

A further aspect of the invention resides in a method of forming an aircraft brake disc comprising:

forming a sheet consisting of longitudinally extending generally parallel long fibres and relatively short lengths of fibre, the parallel fibres being connected by means of said short lengths of fibre;

carbonising fibres in the sheet to form a carbonised sheet;

cutting from the carbonised sheet segmental portions having an outer curved edge and an inner curved edge, and in which the long fibres lie generally parallel to each other and extend from the inner edge to the outer edge;

arranging the segmental portions in successive abutting relation such that the portions describe a helical structure;

compressing axially the so-formed helical structure; and densifying the compressed helical structure by introducing carbon containing vapour to form a carbon matrix.

While we do not wish the invention to be limited in any way by the following theory, our evaluations suggest that any one or more of the following three factors may cause or contribute to the beneficial result. First, the fact that the fibres extend generally parallel to each other and (nominally) radially across the wear face; second the fact that such fibres are held together by connecting cross-short lengths formed by teased out portions of the fibres which extend perpendicular to the longitudinal radial fibres; and third, the orientation and interconnection of fibres gives a structure with accessible open porosity that traps wear debris to assist the development and retention of a surface debris film.

In order that the invention may be well understood it will now be described by way of example only with reference to the accompanying diagrammatic drawings in which.

Figure 1:
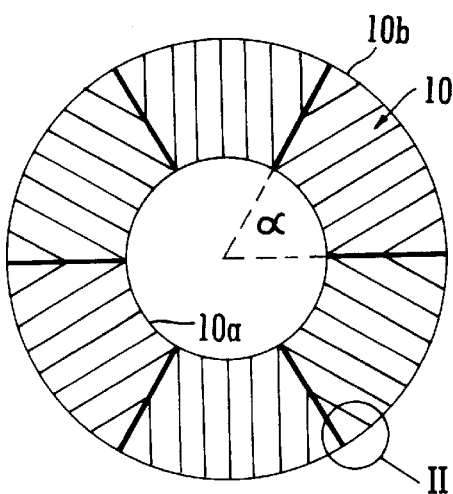
FIG. 1 is a plan view of a preform used to make a brake disc of the invention.
Figure 2:
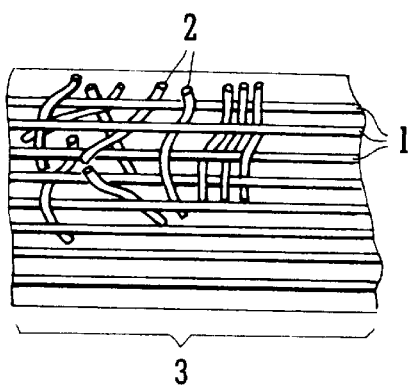
FIG. 2 is an enlarged plan view of the area ringed II in FIG. 1.
Figure 3:
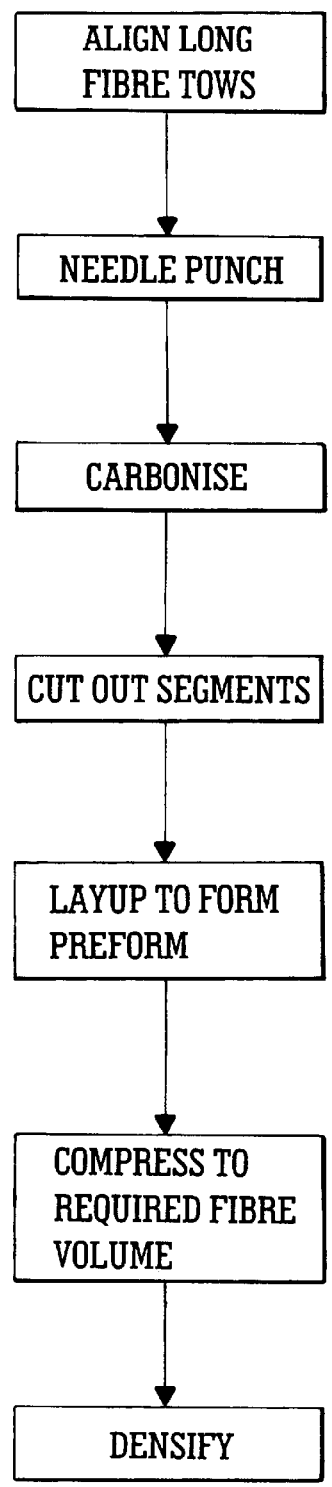
FIG. 3 is a flow chart showing steps in manufacture of the brake disc involving a preform of FIG. 1.

In the method, long fibre tows are aligned such that the long fibres 1 are laid in parallel which are then united by needle punching using barbed needles so that some lengths of fibres are teased into the next to form short connecting cross fibre lengths 2 as shown in FIG. 2. The resultant coherent sheet-like material 3 comprises a network of the long substantially parallel lengths of fibre joined by transverse short lengths. The sheets are then placed in a furnace until the fibres are carbonised. Segmental portions 10 are then cut from the sheets and then arranged at a segment angle α, FIG. 1, in a circle to form an annular shape (FIG. 1). The segmental portions thus have an inner curved edge 10a and an outer curved edge 10b, the outer edge being of a relatively greater length. The layers are located about a central bung, not shown, to form an aperture 11. Preferably, successive layers of segments are stacked in a spiral arrangement so that the junction lines at the joints between segments of one layer are radially offset from the junction lines between segments in adjacent layers in order to avoid lines of weakness in the composite. The preform is made up of a number of layers each of which has a structure of longitudinally extending long fibres locked together by means of the needle punched short fibres, the long fibres extending generally parallel to the intended wear surface. Layers of fabric can then be compressed in a direction normal to the longitudinal direction of the long fibres, which is to say such that successive layers are pressed into closer arrangement, to the required fibre volume in known manner. The preform is then densified in known manner.

A brake disc of the invention has improved wear resistance (as determined by weight loss) in comparison with a brake disc in which the fibres all extended circumferentially and another in which segments in the preform had non-radial fibres which were alternated with segments having radial fibres.

In order that the invention may be better understood it will be further described by way of illustration with reference to the following example.

EXAMPLE 1

Brake discs for friction and wear testing were manufactured as described below and also referring to the drawings.

A non-woven fabric comprising a layer of oxidised polyacrylonitrile (O-PAN) fibre staple felt needled to long parallel O-PAN fibres was manufactured as described in GB patent 2,012,671. The ratio of long fibre weight to staple fibre weight was 3:1. This fabric was then carbonised under conditions known in the art to remove volatiles, leaving a fabric having about 400 gcm$^{-2}$ weight per unit area and with a chemical composition of about 85%+carbon.

Segmental portions were cut from the carbonised fabric, the cutting being arranged so that the continuous fibres run generally radially in the segment as shown in the drawings. A segment angle of 48° was used to avoid alignment of segment joints across adjacent layers. Segments were laid up in a spiral fashion about a central bung to form an annular shape (FIG. 1). The lay up was continued until sufficient segments had been added to achieve a 20% fibre volume when the central bung was removed and the assembly of segments was compressed to a predetermined volume in a suitable fixture. The assembly was then infiltrated with carbon to a density of approximately 1.3 gcm$^{-3}$ by chemical vapour infiltration, taken from the compression fixture and further infiltrated until a disc density of over 1.8 gcm$^{-3}$ was achieved. The infiltrated discs were then graphitised by heat treating to 2400° C. in an inert atmosphere and then machined to final dimensions.

Friction and wear testing was carried out on a set of three discs in the configuration of two stators and one rotor. The stator discs had an outer disc periphery diameter of approximately 27.9 cm (11.0 inches), inner disc periphery diameter of approximately 11.8 cm (4.6 inches), and a thickness of approximately 1.14 cm (0.45 inches). The rotor disc had an outer periphery diameter of approximately 30.4 cm (12.0 inches), an inner periphery diameter of approximately 14.2 cm (5.6 inches) and a thickness of approximately 0.97 cm (0.38 inches). The two stators were keyed around the inner periphery to a torque tube fixed to the dynamometer chassis from where torque is measured through a load cell and recorded by the control computer for calculation of friction co-efficient during testing under constant pressure conditions. The single rotor disc was interleaved between the two stator discs, the rotor being keyed to the wheel so as to rotate with the wheel which is driven by a motor and flywheel. During testing, pressure is applied from a hydraulic piston assembly mounted at one end of the torque tube. The pressure compresses the friction faces of the discs against one another to generate friction for the braking action, thereby slowing the wheel and flywheel by transmitting the braking torque through the rotor to the wheel until rotation of the wheel stops.

A test programme of 50 test cycles was carried out on the brake, the test cycles being designed to represent aircraft service cycles. Each test cycle simulated a taxi-out sequence, a service energy landing stop and a taxi-in sequence. The set of 3 brake discs was weighed before testing and after completing the 50 test cycles. The weight loss during testing (representing the brake wear) is shown in the Table below.

Brake discs of the invention were tested in comparison with discs in which the long fibres were arranged differently. In one comparative disc the long fibres extended generally tangentially and in another there were segments of long fibres according to this invention alternating with segments in which the long fibres extended generally tangentially (see EP-A-424988).

TABLE

| Test Pieces | Wear Test Weight Loss (g) |
| --- | --- |
| Brake discs of the invention | 12.0 |
| Brake discs with tangential fibres | 63.7 |
| Brake disc with alternating segments | 23.9 |

The results demonstrate that a brake disc of the invention undergoes significantly less weight loss.

Because of the improved wear resistance, a brake disc of the invention will have a longer life both when used to brake an aircraft when the aircraft is landing and when taxiing while on the ground.

Although the invention and the benefits thereof have been described in relation to an aircraft brake disc the invention is equally applicable to other articles such as discs for use in motor vehicles, motorcycles, trains, clutch discs; or the like.

The invention is not limited to the embodiment shown. For example, other ingredients may be present in the sheet. The long fibres may be united in other ways. The fibre segments could be held together by needle punching before infiltration so that compression in a fixture was not required. The layers may be present at one or both of the wear surfaces of the disc which may be separated by an intermediate portion of a different structure. The densification need not be by chemical vapour infiltration. The disc may be used in say a clutch mechanism. The invention is also applicable to composite friction materials with reinforcing fibres and/or matrix other than carbon, for example silicon carbide or boron nitride.

What is claimed is:

1. An annular body having opposite faces an a generally circular aperture, the body comprising a plurality of layers held in a carbon matrix, the layers of the body being made up of segmental portions arranged in general side-by-side abutting relations, wherein each segmental portion has a plurality of fibers radially disposed which only extend in generally parallel relation from an inner edge to an outer edge thereof.

2. A body according to claim 1, wherein at least some of the parallel fibres are connected by relatively short connecting lengths of fibre.

3. A body according to claim 2, wherein the relatively short connecting lengths are formed by needle punching short staple fibres to the parallel fibres, the short fibres in the staple felt being perpendicular to the parallel fibres.

4. A body according to claim 1, wherein the parallel fibres are made from a stabilised or oxidised form of rayon, polyacrylonitrile; wool; pitch; or any combination thereof that will, on further heat treatment, produce carbon fibres.

5. A body according to claim 1, wherein the parallel fibres are silicon carbide or boron nitride.

6. A body according to claim 1, wherein the mental portions are arranged at a segment angle of 20° to 70°.

7. A body according to claim 6, wherein the segment angle is in the range of 40° to 50°.

8. An aircraft brake disc comprising a body according to claim 1.

9. A body according to claim 1, shaped as a brake or clutch disc.

10. A method of forming an annular body comprising a plurality of layers held in a carbon matrix, the method comprising:
   forming a sheet consisting essentially of longitudinally extending generally parallel long fibres;
   carbonising fibres in the sheet to form a carbonised sheet;
   cutting from the carbonised sheet segmental portions having an outer curved edge and an inner curved edge, and in which the fibres lie generally parallel to each other and extend only from the inner edge to the outer edge;
   arranging the segmental portions in a circular array to form an annular layer whereby the fibers extend radially;
   building up a plurality of the layers to form a preform; and
   densifying the preform by introducing carbon containing vapour to form the carbon matrix.

11. A method according to claim 10, wherein the fibres are made from stabilised or oxidised form of rayon, polyacrylonitrile; wool; pitch; or any combination thereof that will, on further heat treatment, produce carbon fibres.

12. A method according to claim 10, wherein the fibres are made from silicon carbide or boron nitride.

13. A method of forming an aircraft brake disc comprising:
   forming a sheet consisting of longitudinally extending generally parallel long fibres and relatively short lengths of fibre, the parallel fibres being connected by means of said relatively short lengths of fibre;
   carbonising fibres in the sheet to form a carbonised sheet;
   cutting from the carbonised sheet segmental portions having an outer curved edge and an inner curved edge, and in which the long fibres lie generally parallel to each other and extend only from the inner edge to the outer edge;
   arranging the segmental portions in successive abutting relation such that the portions describe a helical structure whereby the fibers extend radially;
   compressing axially the so-formed helical structure; and
   densifying the compressed helical structure by introducing carbon containing vapour to form a carbon matrix.

14. A method according to claim 13, wherein the segmental portions are cut such that their segment angles are in a range from 20° to 70°.

15. A method according to claim 14, wherein the segment angles are in a range from 40° to 50°.

16. A method according to claim 13, wherein the fibres are made from stabilised or oxidised form of rayon, polyacrylonitrile; wool; pitch; or any combination thereof that will, on further heat treatment, produce carbon fibres.

* * * * *

UNITED STATES PATENT AND TRADEMARK OFFICE
CERTIFICATE OF CORRECTION

PATENT NO. : 6,660,355 B2
DATED : December 9, 2003
INVENTOR(S) : David Callum Johnson It is certified that error appears in the above-identified patent and that said Letters Patent is hereby corrected as shown below:

<u>Title page,</u>
Insert Items:

-- [22] PCT Filed: November 25, 1999
   [86] PCT No.: PCT/GB99/03940 --

Signed and Sealed this

Sixth Day of July, 2004

JON W. DUDAS
*Acting Director of the United States Patent and Trademark Office*